(12) United States Patent
Zhao et al.

(10) Patent No.: US 7,673,092 B2
(45) Date of Patent: Mar. 2, 2010

(54) PCI EXPRESS INTERFACE

(75) Inventors: Qian Zhao, Beijing (CN); Hao Chen, Beijing (CN)

(73) Assignees: Legend Holdings Ltd., Beijing (CN); Lenovo (Beijing) Limited, Beijing (CN)

( * ) Notice: Subject to any disclaimer, the term of this patent is extended or adjusted under 35 U.S.C. 154(b) by 42 days.

(21) Appl. No.: 12/112,079

(22) Filed: Apr. 30, 2008

(65) Prior Publication Data
US 2009/0006709 A1 Jan. 1, 2009

(30) Foreign Application Priority Data
Jun. 28, 2007 (CN) .................. 2007 1 0118089

(51) Int. Cl.
*G06F 13/00* (2006.01)
(52) U.S. Cl. ...................... 710/313; 439/291
(58) Field of Classification Search .............. 710/105, 710/300, 305, 313; 439/59, 60, 248, 282, 439/284, 287, 289, 291, 344, 535, 660–701
See application file for complete search history.

(56) References Cited

U.S. PATENT DOCUMENTS

2005/0059301 A1* 3/2005 Chou et al. ................. 439/660
2006/0286865 A1* 12/2006 Chou et al. ................. 439/607

* cited by examiner

*Primary Examiner*—Glenn A Auve
(74) *Attorney, Agent, or Firm*—Dickstein, Shapiro, LLP.

(57) ABSTRACT

The present invention discloses a PCI Express interface compatible with USB interface comprising a power supply terminal and a ground terminal, in which four data terminals include two data transmitting terminals and two data receiving terminals, characterized in that the power supply terminal and the ground terminal of said interface coincide with the corresponding terminals of USB interface specification, two of said four data terminals are guaranteed to have their positions and widths overlaid with the position of terminal D+ in USB interface specification and not with the position of terminal D– in USB interface specification, and the other two data terminals are guaranteed to have their positions and widths overlaid with the position of terminal D– in USB interface specification and not with the position of terminal D+ in USB interface specification. The PCI Express interface compatible with USB interface can provide a data transmission rate up to 3 Gb/S according to PCI Express interface specification and support to the conventional USB peripheral devices without any modification on them. It further has the advantages of small-sized outline and convenience in use.

7 Claims, 4 Drawing Sheets

PCI EXPRESS INTERFACE

BACKGROUND OF THE INVENTION

1. Field of Invention

The present invention relates to a data interface for accessing peripheral devices and personal computers, and in particular to a PCI Express (Peripheral Component Interconnect Express) interface.

2. Description of Prior Art

Universal Serial Bus (USB) is a public interface standard for accessing peripheral devices and personal computers. Recently, the application of USB has been extended to a large number of consumer electronics and mobile devices. Interfaces complying with the specification of USB 2.0 have now been enjoying wide application, since the USB 2.0 interface has a highest speed of 480 Mb/S and also the capability of power supply, which leads to the popularity of the USB 2.0 interface in the current field of PC interface. As storage capacity and network speed enters the epoch of Gigabyte, however, the data connection between PC and peripheral devices requires a higher transmission rate, and USB 2.0 is having difficulty in meeting the continuous growing requirement of access rate. Therefore, there is a pressing need for a new interface specification with respect to data connection between PC and peripheral devices.

A solution is utilizing an eSATA (e Serial Advanced Technology Attachment) interface to lead a SATA interface out of the PC mainframe, and such interface can support a bandwidth of 3 Gb/S. Unfortunately, this solution has drawbacks in that no power supply signal is provided in such interface and thus it is impossible to power the device. In addition, the interface supports only simple storage devices, and thus it is difficult to connect a large number of consumer electronics with the computer via the interface. Further, this solution is not compatible with many existing USB devices.

Another solution is ExpressCard interface being applied widely to notebook computers and capable of supporting a data transmission rate of 3 Gb/S. The ExpressCard interface can supply power to storage devices and support all of PCI Express interface, USB interface and the like. PCI Express interface can be simply referred to as PCIe interface, which inherits the existing PCI communication standard while being based on a faster serial communication system. The ExpressCard interface is divided into two categories of ExpressCard|34 and ExpressCard|54, which appearances are shown in FIGS. 1(a) and 1(b), respectively. As can be seen from the figures, the ExpressCard|34 interface has a large outline size of 75×34 mm, even though it is smaller than the other one. Although the interface has support for USB devices, such support is established on the basis that the interfaces of the USB devices also adopt the specification of ExpressCard interface, while the conventional USB device cannot be supported by the interface. Therefore, it lacks compatibility with many existing devices of USB interface.

SUMMARY OF THE INVENTION

In view of the above problems, the primary object of the present invention is to provide a data interface for accessing a peripheral device and a personal computer, which can be compatible with the currently-used USB interface specification and also support the PCIe interface specification with a high data transmission rate.

In order to achieve the above object, the present invention adopts the following technical solution.

According to the invention, it provides a Peripheral Component Interconnect Express (PCI Express) interface. It comprises a power supply terminal and a ground terminal, in which four data terminals include two data transmitting terminals and two data receiving terminals. The power supply terminal and the ground terminal of said interface coincide with the corresponding terminals of USB interface specification, two of said four data terminals are guaranteed to have their positions and widths overlaid with the position of terminal D+ in USB interface specification and not with the position of terminal D− in USB interface specification, and the other two data terminals are guaranteed to have their positions and widths overlaid with the position of terminal D− in USB interface specification and not with the position of terminal D+ in USB interface specification.

Preferably, the positions of said four data terminals of said interface have such correspondence to the positions of the terminals of USB interface that terminals PT−, PR+ correspond to terminal D+ of USB interface, and terminals PT+, PR− correspond to terminal D− of USB interface.

Preferably, said interface further comprises an interface detection unit for detecting the interface type fitting said interface and controlling the output of an interface enable signal corresponding to the detected interface type.

Preferably, said interface detection unit is integrated in a south-bridge chip of a computer.

Preferably, said interface detection unit is integrated into an Application-Specific Integrated Chip.

Preferably, said interface detection unit comprises a signal transmitting module, a signal comparison module and a switching control module, in which the signal transmitting module is connected to the signal comparison module and provides an output signal to the signal comparison module and the output terminals of the interface, the signal comparison module is connected to the switching control module and responsible for comparing the output signal and an input signal received from the input terminals of the interface and transmitting the comparison result to the switching control module, and the switching control module controls the output of different interface enable signals.

The PCIe interface compatible with USB interface can provide a data transmission rate up to 3 Gb/S according to PCIe interface specification and support to the conventional USB devices without any modification on them.

The present invention can further detects automatically whether the peripheral device is one complying with PCIe interface specification or with USB interface specification and thus provide suitable transmission protocol for each of the two different types of devices.

Furthermore, the interface of the present invention has an outline exactly the same as that of the older USB interface and thus a small dimension, and the peripheral device using such interface exhibits the advantages of convenience in carrying and usage.

DETAILED DESCRIPTION OF PREFERRED EMBODIMENTS

Now, the present invention will be elaborated with respect to the figures and particular embodiments.

The PCIe interface compatible with USB interface according to the present invention can support a larger number of current USB interface devices and the PCIe interface specification of a high data transmission rate. For the purpose of a simple description, hereafter, a plug employing the PCIe interface specification compatible with USB interface according to the present invention will be called new plug, and a socket employing the PCIe interface specification compatible with USB interface according to the present invention will be called new socket.

Figure 1A:
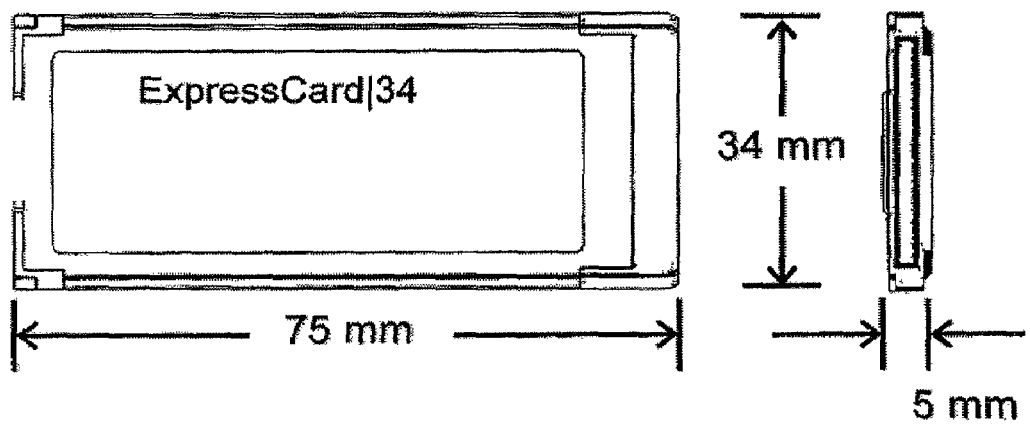
FIG. 1(a) is an outline diagram of the prior art ExpressCard|34 interface specification.
Figure 1B:
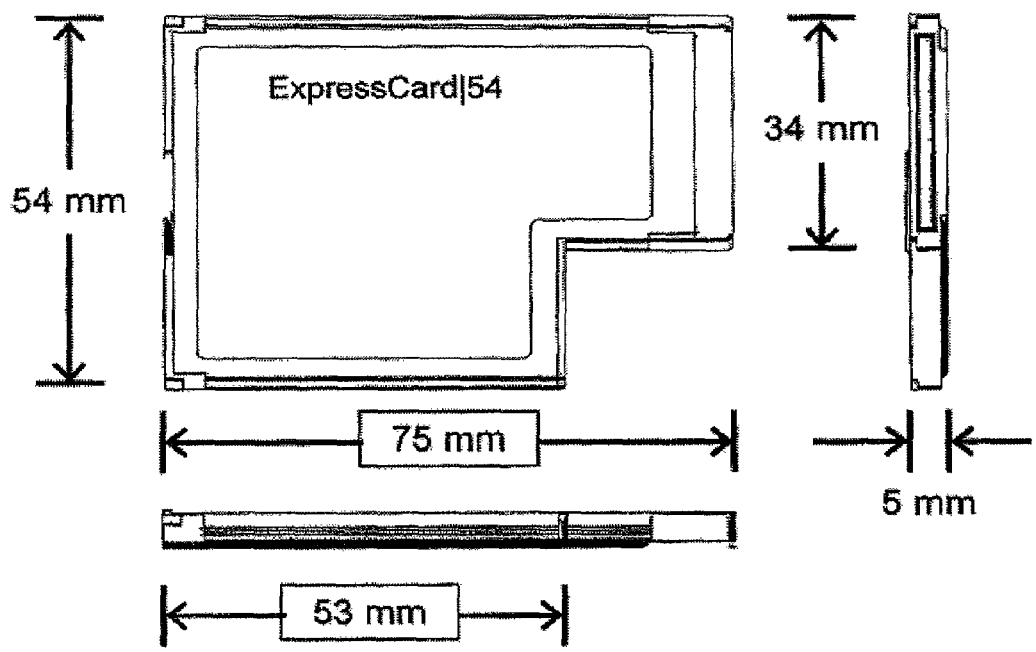
FIG. 1(b) is an outline diagram of the prior art ExpressCard|54 interface specification.
Figure 2:
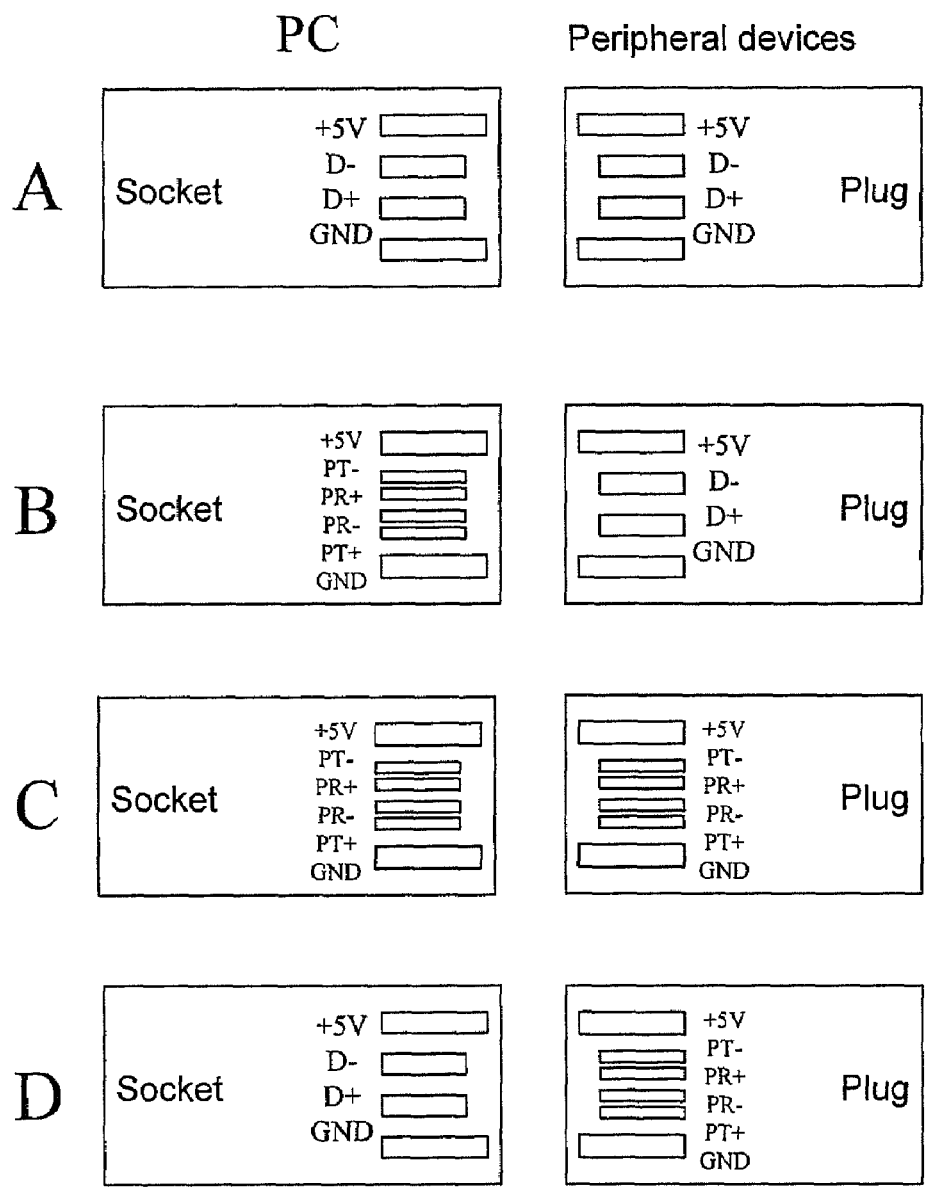
FIG. 2 shows several possible configurations of PCIe interface compatible with USB interface according to the present invention.

The connection terminals of the present interface adopts a structure as shown in FIG. 2 so as to be compatible with the existing USB interface. The terminals D+ and D− of the USB interface are each partitioned into two halves and thus become 4 data terminals for drawing out PCIe signals corresponding to PT+, PT−, PR+ and PR−, respectively, while the other terminals of the USB interface remains in the same definition. This partition is not solely defined and can be achieved by splitting D+ into PT+ and PR− and D− into PT− and PR+ or by splitting D+ into PT+ and PT− and D− into PR+ and PR−. Other partition approaches can also be used, and only the connection wires behind the terminals need to be modified accordingly. As one preferred embodiment of the present invention, D+ of the USB interface is split into PT+ and PR− while D− into PT− and PR+.

With such partition, the terminals of PT+ and PR− do not necessarily correspond to the width of the terminal D+ of the USB interface, and the terminals of PT− and PR+ do not necessarily correspond to the width of the terminal D− of the USB interface. In fact, as long as the power supply terminal and the ground terminal of the interface are consistent with the corresponding ones in USB interface specification, it can be ensured that two of the four data terminals have their positions and widths overlaid with those of the terminal D+ in USB interface specification but not with those of the terminal D− in USB interface specification, and, on the other hand, the other two terminals have their positions and widths overlaid with those of the terminal D− in USB interface specification but not with those of the terminal D+ in USB interface specification.

The terminals PT−, PR+, PT+ and PR− in the PCIe interface compatible with USB interface are not necessarily arranged in parallel as shown in FIG. 2. Instead, the terminals PT− and PR+ can be arranged in the order of insertion direction, as long as they are guaranteed to keep contact with the terminal D− in USB interface rather than the terminal D+. The terminals PT+ and PR− can also be arranged in any other manner insofar as the proper correspondence can be ensured.

With respect to portion A of FIG. 2 is shown a fitting relation between a conventional USB socket and a conventional USB plug. After the introduction of the PCIe interface compatible with USB interface according to the present invention, several new fitting relations emerges as new socket with conventional USB plug, new socket with new plug, conventional USB socket with new plug, as shown in portions B, C and D of FIG. 2, respectively.

As can be seen in portion B of FIG. 2, when the conventional USB plug is inserted in the new socket, since the terminals D+ and D− of the conventional USB plug each have a larger width than those of the terminals PT+, PT−, PR+ and PR− of the new socket, the terminals PT+, PR− of the new socket will be shorted by the terminal D+ of the USB interface, and the terminals PT−, PR+ of the new socket will be shorted by the terminal D− of the USB interface. Therefore, it is can be determined that a conventional USB plug has been inserted in a new socket if the short circuit of the terminals PT+, PR− or the terminals PT−, PR+ of the new socket can be detected by a detection device. As shown in portion C of FIG. 2, when a new plug has been inserted in a new socket, the PCIe terminals of them correspond to each other, and thus the PCIe interface specification with a high data transmission rate can be used.

To implement adaptive identification of interface, an interface detection unit needs to be provided for the side of providing the new socket, usually the PC side. The interface detection unit is connected to the input terminals PR+ and PR− of the PCIe interface and provides a USB output enable signal line and a PCIe output enable signal line to cooperate with the USB and PCIe data lines of PC in transmitting signals to the terminals D+, D− of USB interface, actually transmitting to the terminals PT+, PR− and PT+, PR+ at the same time, according to USB interface protocol as well as in transmitting signals to the terminals PT+, PT− of PCIe interface according to PCIe interface protocol. The interface detection unit can determine whether the terminals PT+, PR− of the new socket are shorted as well as whether the terminals PT−, PR+ of the new socket are shorted. If any short circuit exists among these terminals, the device inserted in the new socket is regarded as a conventional USB device, and the side of the new socket can communicate and transport data with the side of the USB plug in accordance with USB interface protocol. On the other hand, if no short circuit is detected by the interface detection unit, a new plug is regarded as inserted in the new socket, which can communicate and transport data with the side of the new plug in accordance with PCIe interface.

Figure 3:
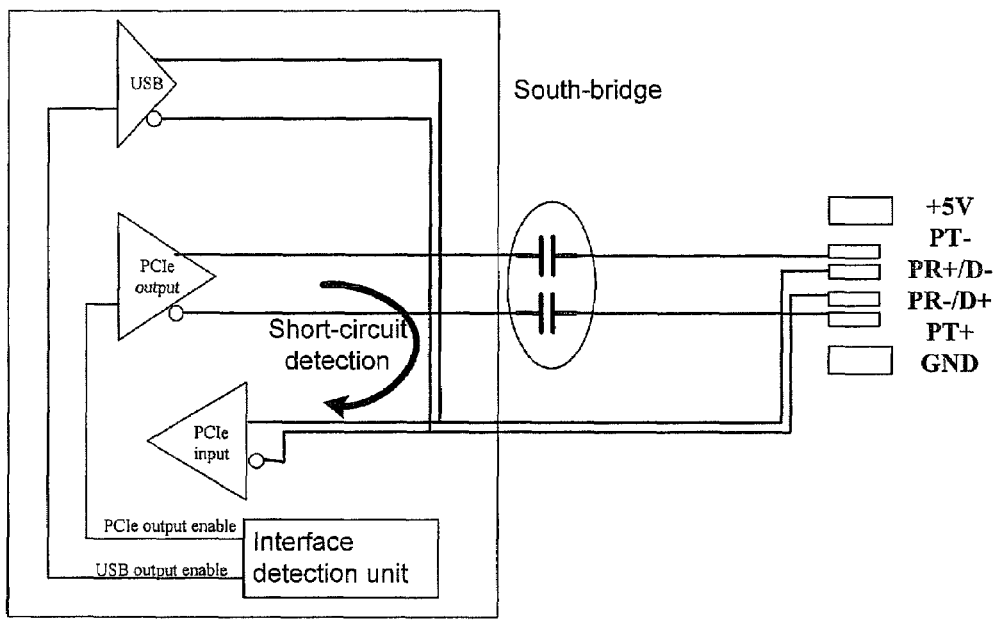
FIG. 3 is a schematic diagram of one embodiment of PCIe interface compatible with USB interface according to the present invention.

As shown in FIG. 3, this interface detection unit can be directly embedded in a south-bridge chip of a computer, and the detection of short circuit can be accomplished within the south-bridge chip. Based on the result of short circuit detection, a USB or PCIe output enable signal is issued by the interface detection unit to cooperate with the USB or PCIe data line of PC in performing communication and data transmission between the PC and peripheral devices with corresponding transmission interface protocol.

Figure 4:
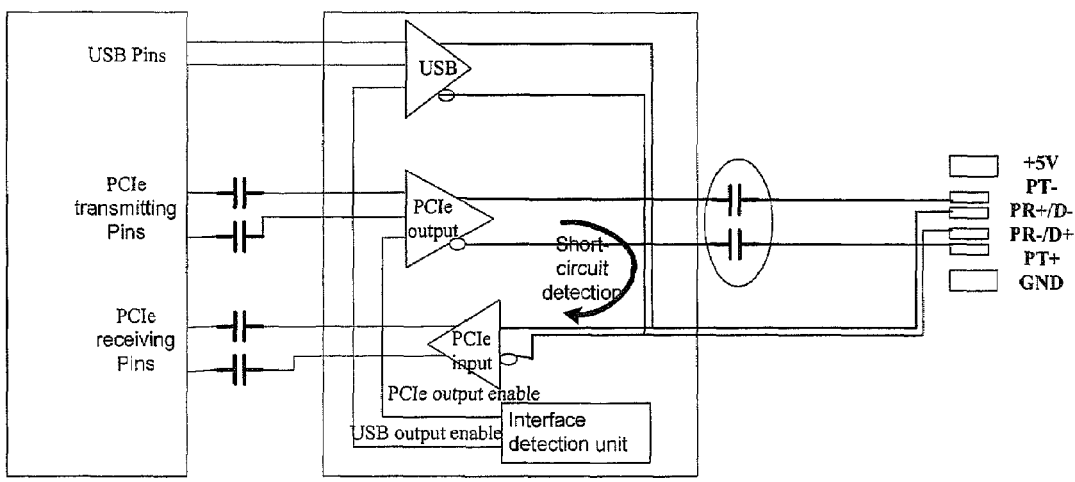
FIG. 4 is a schematic diagram of another embodiment of PCIe interface compatible with USB interface according to the present invention.

As shown in FIG. 4, the interface detection unit is realized by ASIC (Application-Specific Integrated Circuit) which is connected to the USB data pins and PCIe transmitting and receiving pins in the PCIe slot of the PC. The detection of short circuit can be accomplished within the ASIC. Based on the result of short circuit detection, a USB or PCIe output enable signal is issued by the interface detection unit to cooperate with the USB or PCIe data line of PC in performing communication and data transmission between the PC and peripheral devices with corresponding transmission interface protocol.

Various options are possible for the approach of interface detection. For example, the short circuit among the terminals can be determined by sending a high level or a low level directly to the terminal PT+ or PT− by the interface detection unit and then detecting the level of the terminal PR− or PR+.

Figure 5:
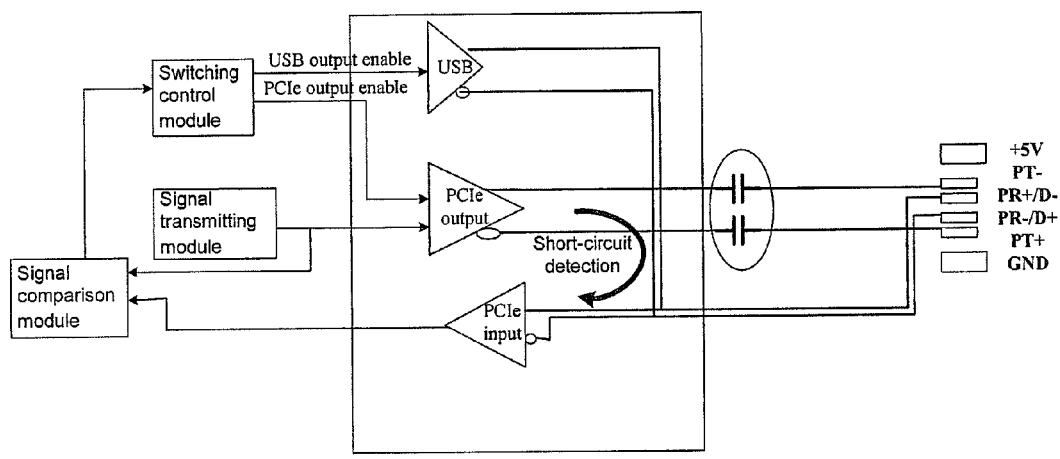
FIG. 5 is a diagram of functional modules inside the interface detection unit of PCIe interface compatible with USB interface according to the present invention.

FIG. 5 shows the embodiment of another interface detection unit comprising a signal transmitting module, a signal comparison module and a switching control module, in which the signal transmitting module is connected to the signal comparison module, transmits an output signal conforming to PCIe protocol to the PCIe output terminal PT+ or PT− and provides this output signal to the signal comparison module. The signal comparison module is connected to the PCIe input terminal PR+ or PR− to acquire input signals via the two terminals. The signal comparison module is also connected to the switching control module so that the former can send a comparison result to the latter after the comparison between the output signal and an input signal received from PR− or PR+. The switching control module controls the output of different interface enable signals including USB output enable signal and PCIe output enable signal.

Figure 6:
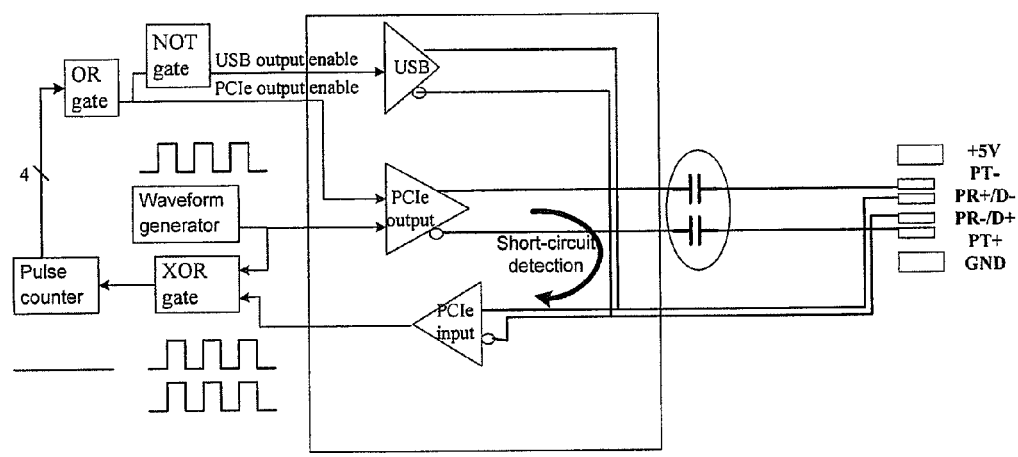
FIG. 6 is an embodiment of the interface detection unit of PCIe interface compatible with USB interface according to the present invention.

As shown in a particular embodiment in FIG. 6, the signal transmitting module is implemented with a waveform generator, the signal comparison module with an XOR gate circuit and a pulse counter, and the switching control circuit with an OR gate circuit and a NOT gate circuit. In order to detect whether an inserted plug is a USB plug or a new plug, the waveform generator transmits a set of specific output waveform signals, which are sent to the XOR gate circuit at the same time. If a USB device is inserted, the PCIe output and input terminals of the slot are shorted together, and the transmitted output waveform signals are directly sent into the XOR gate circuit by the short-circuited PCIe input terminals PR+ and PR−.

The XOR gate circuit compares the output waveform signals with the input signals received from the input terminals, and, if the two paths of signals are identical, it is indicated that PT− and PR+, PT+ and PR− of PCIe are shorted, and constant 0 will be outputted. On the other hand, if the two paths of signals are different, it is indicated that no short circuit exists among PT− and PR+, PT+ and PR− of PCIe, and certain pulse waveform will be outputted. The pulse counter counts the number of pulses in the waveform and gives a count output of 0 if the count result is constant 0, otherwise the count output is more than 0. The OR gate circuit performs OR operation on the output of the pulse counter and output 0 if the count output is 0. The output 0 turns out to be 1 after passing through the Not gate circuit, and a USB output enable signal is issued in this case. When the output of the pulse counter is larger than 0, the OR gate circuit outputs 1, and a PCIe output enable signal will be issued.

For the situation shown as portion D of FIG. 2, if a new plug is inserted in a conventional USB slot, the device having the new plug can be enabled to adaptively select USB or PCIe interface protocol to be used in data transmission, as long as this device has the above interface detection unit and a control circuit and can support both of USB and PCIe interface protocols.

The foregoing description illustrates merely the preferred embodiments of the present invention and has no intention of limiting the scope of the present invention. Those skilled in the art should envisage that various correspondences between data terminals of PCIe and USB interfaces, PCIe interfaces composed of data terminals with different shape characteristics and PCIe interfaces including interface detection units of different internal structure should fall into the scope of the present invention.

What is claimed is:

1. A Peripheral Component Interconnect Express (PCI Express) interface comprising a power supply terminal and a ground terminal, in which four data terminals include two data transmitting terminals and two data receiving terminals, characterized in that the power supply terminal and the ground terminal of said interface coincide with the corresponding terminals of USB interface specification, two of said four data terminals are guaranteed to have their positions and widths overlaid with the position of terminal D+ in USB interface specification and not with the position of terminal D− in USB interface specification, and the other two data terminals are guaranteed to have their positions and widths overlaid with the position of terminal D− in USB interface specification and not with the position of terminal D+ in USB interface specification.

2. The PCI Express interface of claim 1, characterized in that the positions of said four data terminals of said interface have such correspondence to the positions of the terminals of USB interface that terminals PT−, PR+ correspond to terminal D+ of USB interface, and terminals PT+, PR− correspond to terminal D− of USB interface.

3. The PCI Express interface of claim 2, characterized in that said interface further comprises an interface detection unit for detecting the interface type fitting said interface and controlling the output of an interface enable signal corresponding to the detected interface type.

4. The PCI Express interface of claim 1, characterized in that said interface further comprises an interface detection unit for detecting the interface type fitting said interface and controlling the output of an interface enable signal corresponding to the detected interface type.

5. The PCI Express interface of claim 4, characterized in that said interface detection unit is integrated in a southbridge chip of a computer.

6. The PCI Express interface of claim 4, characterized in that said interface detection unit is integrated into an Application-Specific Integrated Chip.

7. The PCI Express interface of claim 4, characterized in that said interface detection unit comprises a signal transmitting module, a signal comparison module and a switching control module, in which the signal transmitting module is connected to the signal comparison module and provides an output signal to the signal comparison module and the output terminals of the interface, the signal comparison module is connected to the switching control module and responsible for comparing the output signal and an input signal received from the input terminals of the interface and transmitting the comparison result to the switching control module, and the switching control module controls the output of different interface enable signals.

* * * * *